(12) United States Patent
Moreno

(10) Patent No.: US 6,904,895 B1
(45) Date of Patent: Jun. 14, 2005

(54) ELECTRO-HYDRAULIC MANIFOLD ASSEMBLY AND METHOD OF MAKING SAME

(75) Inventor: Jorge A. Moreno, Auburn Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/775,563

(22) Filed: Feb. 10, 2004

(51) Int. Cl.$^7$ ............................................. F02M 37/04
(52) U.S. Cl. ................ 123/470; 123/198 F; 123/90.13; 439/130; 239/600
(58) Field of Search ........................... 123/90.12, 90.13, 123/198 F, 90.11, 90.15, 90.16, 90.33, 90.38, 470, 469, 468, 456; 239/600; 439/76, 79, 80, 130

(56) References Cited

U.S. PATENT DOCUMENTS

| | | | | |
|---|---|---|---|---|
| 4,844,036 A | * | 7/1989 | Bassler et al. ............... | 123/470 |
| 5,030,116 A | * | 7/1991 | Sakai et al. .................. | 439/130 |
| 5,295,468 A | * | 3/1994 | Blessing et al. ............. | 123/456 |
| 5,373,817 A | | 12/1994 | Schechter et al. ......... | 123/90.12 |
| 5,513,202 A | * | 4/1996 | Kobayashi et al. ............ | 372/96 |
| 5,663,881 A | * | 9/1997 | Cook, Jr. ..................... | 701/104 |
| 5,718,206 A | * | 2/1998 | Sawada et al. ............. | 123/470 |
| 5,934,253 A | * | 8/1999 | Kojima et al. ............... | 123/470 |
| 5,970,956 A | * | 10/1999 | Sturman ...................... | 123/508 |
| 6,062,200 A | * | 5/2000 | Hofmeister .................. | 123/470 |
| 6,439,176 B1 | | 8/2002 | Payne et al. ............. | 123/90.12 |
| 6,564,775 B1 | * | 5/2003 | Kikuta et al. ............... | 123/456 |
| 6,748,926 B2 | * | 6/2004 | Lee et al. .................... | 123/470 |
| 6,817,325 B2 | * | 11/2004 | Dinkel et al. ............ | 123/90.13 |
| 2003/0226527 A1 | * | 12/2003 | Herbert ................... | 123/90.13 |

* cited by examiner

*Primary Examiner*—Carl S. Miller
(74) *Attorney, Agent, or Firm*—Roger A. Johnston

(57) ABSTRACT

A manifold has a supply inlet communicating with a plurality of spaced supply ports; and, has associated with each supply port a separate control pressure passage. A gasket has a plurality of spaced bosses, each with a valving cavity with an electrically operated valve received and ported in the cavity. Each valving cavity has a supply port communicating with one of the supply ports on the manifold and a control pressure outlet port communicating with one of the control pressure passages on the manifold. A plurality of electrically conductive strips are embedded in the gasket and each is connected to a terminal pin in a receptacle shell formed on the gasket. The remote end of each of the conductor strips is exposed adjacent a valve and makes contact with a terminal on the valve when the valve is received in the respective valving cavity. A common retaining bracket is attached to the manifold and retains the valves and gasket as an assembly on the manifold.

15 Claims, 3 Drawing Sheets

ELECTRO-HYDRAULIC MANIFOLD ASSEMBLY AND METHOD OF MAKING SAME

BACKGROUND OF THE INVENTION

The present invention relates to manifold assemblies of the type having a plurality of electrically operated valves disposed thereon for receiving pressurized fluid from a common gallery in the manifold and, upon electrical energization, each controlling flow individually to an individual control pressure outlet for controlling a fluid pressure actuated device.

Such manifolds are employed for selectively controlling the flow of fluid to hydraulic actuators, such as hydraulic lash adjusters, for enabling and disabling the opening and closing of the combustion chamber valves of an internal combustion engine. In the aforesaid combustion engine valve disablement applications, such manifold assemblies have included a manifold with supply ports for supplying each of the plurality of electrically operated valves and individual control pressure outlet ports which, upon attachment of the manifold to the engine, communicate with corresponding passages in the engine to provide for individual enablement and disablement of the combustion chamber valves.

Heretofore such manifold assemblies for engine valve disablement have employed a gasket with valving cavities formed thereon attached to the manifold, each of which cavities has received therein a valve body communicating with messages through the gasket for controlling flow to the control pressure outlet passages in the manifold. In such arrangements, electrical connection is made to the individual valve operators by either connecting individual leads to the terminals of the valve operator or by a lead frame received over the valves with the terminals of each valve operator connecting to corresponding terminals on the lead frame.

Referring to FIG. 3, a known electro-hydraulic manifold assembly for enabling and disabling combustion chamber valves in an engine is indicated in exploded view at 1 and includes a manifold 2, a common supply pressure inlet 3 communicating with runners which connect the inlet to the plurality of supply pressure ports 4 shown in dashed outline. Associated with each of the supply pressure ports is a control pressure outlet passage 5 which may be formed in a raised portion or boss 6 provided on the manifold. It will be understood that each of the passages 5 passes through the manifold to the underside; and, each of the supply pressure ports also communicate with and are ported on the undersurface of the manifold 2.

A gasket plate 7 has a corresponding pair of supply pressure and control pressure outlet passages denoted respectively 8, 9 located thereon for each of the ports 4 and 5 respectively on the manifold. The passages 8 and 9 on gasket 7 communicate respectively with a valving chamber (not shown) formed in bosses 10 spaced along the underside of the gasket 7. Each of the bosses 10 has received therein an electrically actuated valve 11 with the inlet port 12 thereof visible in FIG. 3.

Each of the valves 11 has a pair of electrical terminals 13 extending downwardly therefrom and a mounting lug 14 is provided on the valve body for securing the valve into the boss 10. A mounting bracket 15 is received over each of the valves 11 and has tabs or lugs 15a formed thereon for engaging the mounting lugs 14; and, bracket 15 is retained by fasteners 16 which pass through apertures formed in the bracket and gasket to threadedly engage the undersurface of the manifold 2, thereby retaining the bracket, valves and gasket securely in place on the manifold.

In the known assembly illustrated in FIG. 3, an electrical frame 17 has a receptacle 18 at one end thereof which is adapted for external electrical connection thereto. Receptacle 18 has a plurality of terminal pins 19, each of which is connected to an individual electrical conductor strip embedded in the lead frame with portions thereof exposed at corresponding locations therealong and have slots 20 formed therein for making bayonet style connection respectively with the terminals 13 on each of the valves.

In certain engine configurations, as for example, V-type engines, the electro-hydraulic manifold is mounted between the cylinder banks where the space available is quite limited. Thus, it has been desired to minimize the size of the electro-hydraulic manifold assembly for attachment to an engine, particularly a V-type engine and to simplify electrical connection and the relative cost of the assembly in high volume mass production.

BRIEF SUMMARY OF THE INVENTION

The present invention provides a unique and relatively low cost electro-hydraulic manifold assembly which is suitable for use with internal combustion engines for controlling valve enablement and disablement which has a reduced profile and volume to facilitate installation in the space between cylinder banks of a V-type engine. The manifold assembly of the present invention employs a gasket plate preferably of suitable plastic material with bosses thereon having valving cavities with solenoid operated valves received therein for, upon electrical energization of the valves, controlling flow between pressure supply ports and control pressure outlet ports associated with each boss. The valves are retained in each boss by a common mounting bracket received thereover with tabs which register against mounting lugs provided on the valve; and, the bracket, valves and gasket are secured to the manifold by suitable fasteners. The gasket has a plurality of electrical conductors embedded therein, preferably by insert molding, which terminate in a common electrical receptacle provided at the end of the gasket. The electrical terminals each have one end exposed and terminating in association with each of the valve mounting bosses found on the gasket; and, corresponding electrical terminal receptacles are provided on each valve and engage the electrical strips in plug in connection upon mounting respectively each of the valves in a boss. The electro-hydraulic manifold assembly of the present invention thus eliminates the need for a lead frame to make an electrical connection to the assembly.

DETAILED DESCRIPTION OF THE INVENTION

Figure 1:
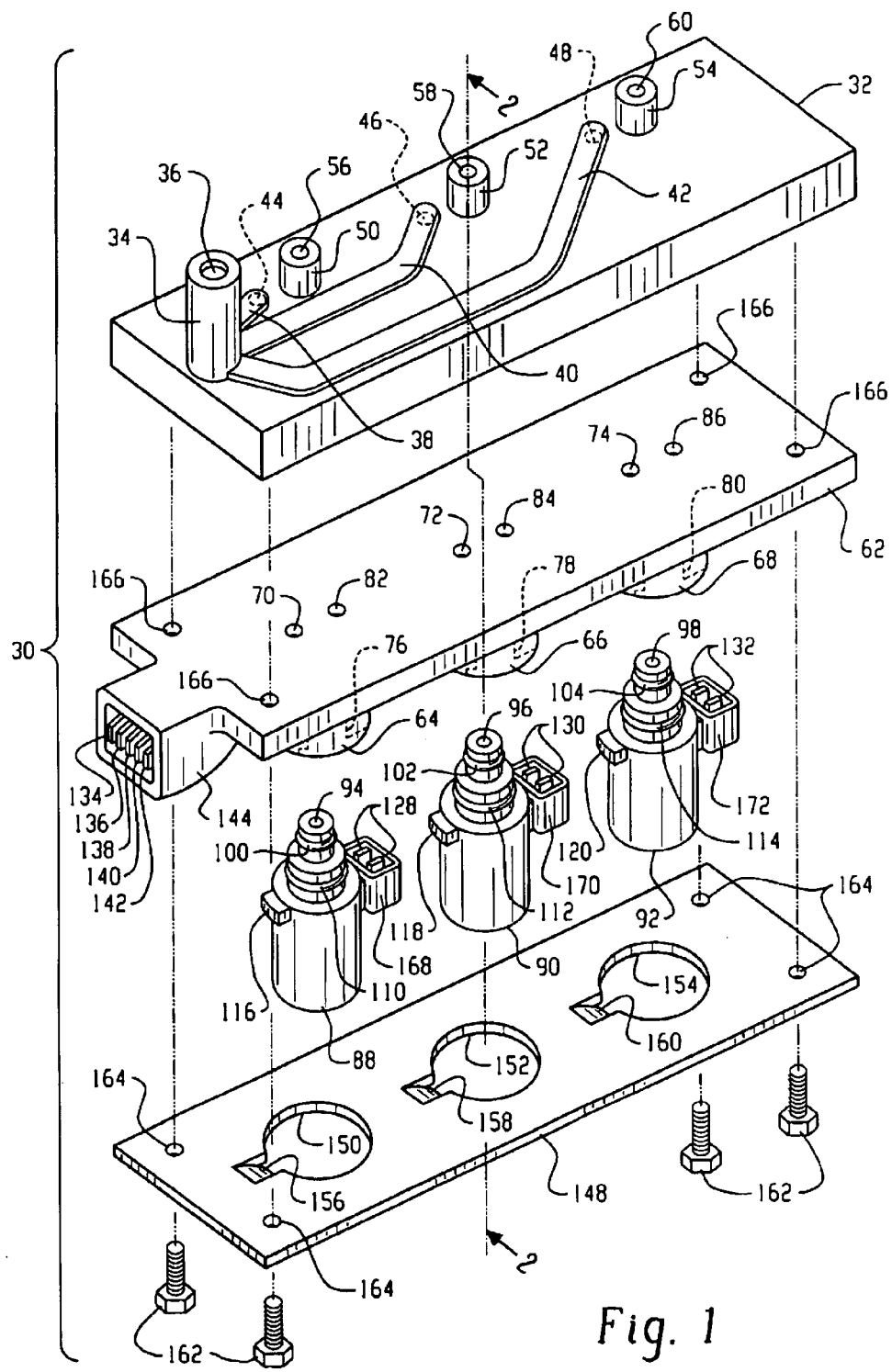
FIG. 1 is an exploded view of an embodiment of a manifold assembly of the present invention.
Figure 2:
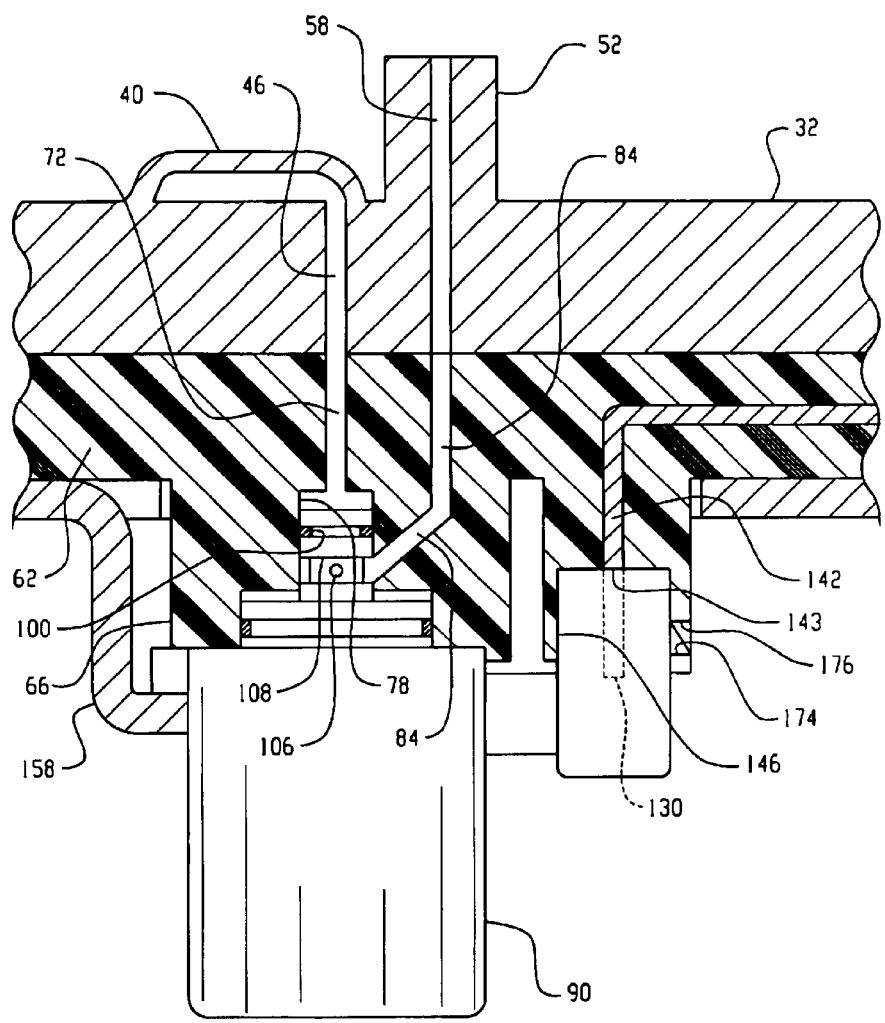
FIG. 2 is a portion of a section view taken along section indicating lines 2—2 of FIG. 1; and, FIG. 3 is an exploded view of a Prior Art assembly.
Figure 3:
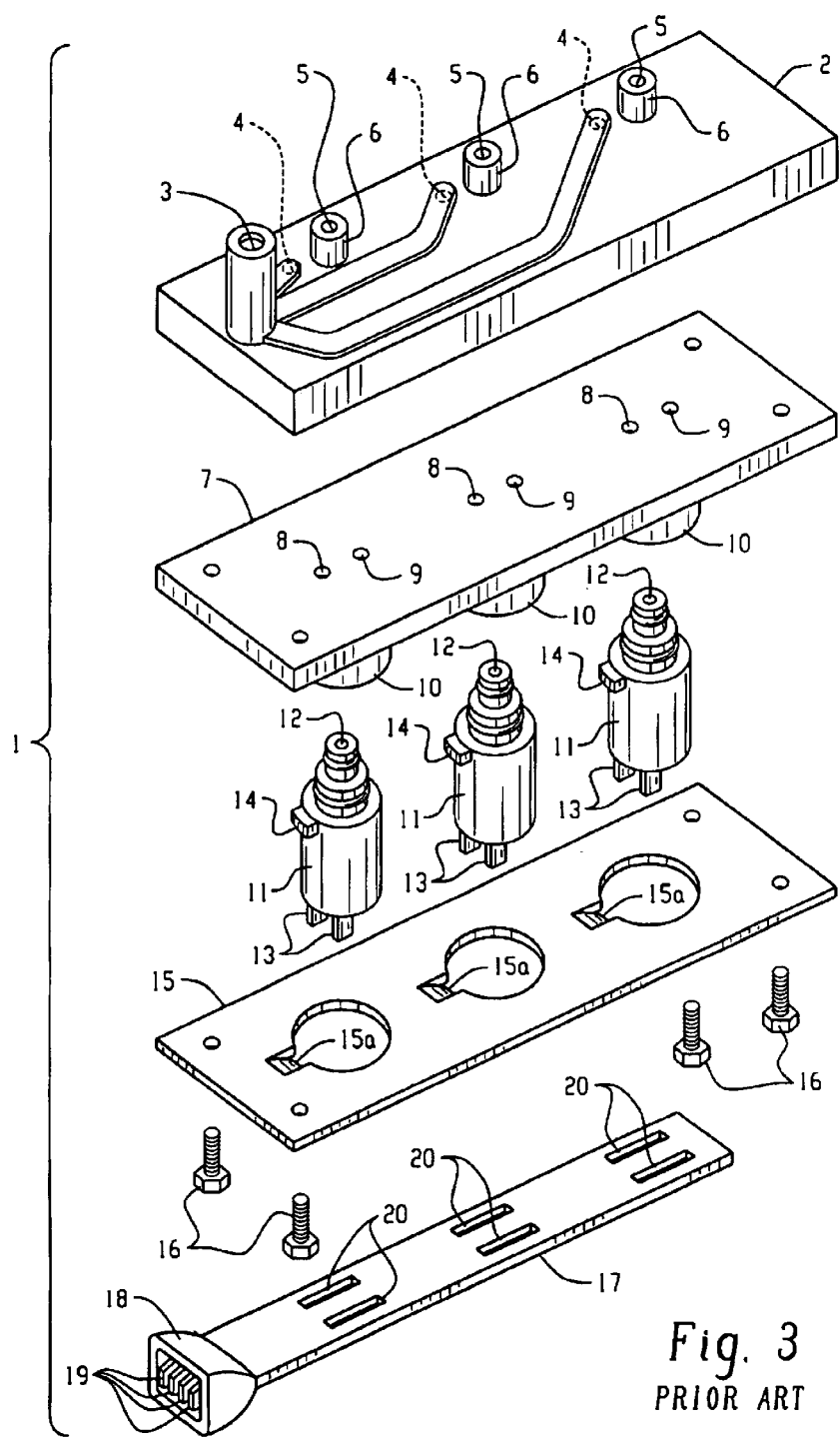

Referring to FIGS. 1 and 2, the electro-hydraulic manifold assembly of the present invention is indicated generally at 30 and includes a manifold 32 having on the upper surface thereof a boss 34 with a pressure inlet supply passage 36 formed therein which communicates with passages formed in runners 38, 40, 42 formed integrally with the manifold. Each of the runners has an internal passage (not shown) therein which communicates respectively with a supply pressure passage shown in dashed outline and denoted respectively 44, 46, 48, each of which is ported to the undersurface of the manifold.

The manifold 32 has a plurality of spaced bosses 50, 52, 54 extending outwardly therefrom, each of which has respectively a control pressure outlet passage 56, 58, 60 respectively provided therein which also passes through and is ported to the undersurface of the manifold.

The assembly 30 further includes a gasket plate 62 preferably formed of plastic material, with a plurality of spaced bosses 64, 66, 68 formed integrally therewith and extending downwardly from the undersurface thereof and which have respectively supply pressure inlet passages 70, 72, 74 formed therein and which extend through the gasket from the upper surface thereof downwardly for communicating with a valving cavity 76, 78, 80 respectively formed in each of the bosses as shown in dashed outline in FIG. 1.

Each of the cavities 76, 78, 80 has a control pressure outlet passage formed therein as denoted 82, 84, 86 respectively and one of these is illustrated in FIG. 2 and denoted by reference numeral 84 and is ported to the upper surface of the gasket for communicating respectively with one of the control outlet passages 56, 58, 60 in the manifold 32.

A solenoid operated valve 88, 90, 92 is received respectively in each one of the valving cavities 64, 66, 68 formed on the gasket 62 with the inlet port of the valve denoted respectively 94, 96, 98 which is isolated from the remainder of the cavity by a resilient seal ring denoted respectively 100, 102, 104 provided a groove formed on the valve. Each of the valves also has an outlet port formed thereon such as port 106 shown in FIG. 2 and preferably disposed in a collector groove 108 formed thereon to eliminate the need for rotational orientation such that the outlet port 106 can communicate with the outlet passage 84 formed in the valving cavity. A second resilient seal ring denoted respectively 110, 112, 114 is provided on the valve body portion of each valve 88, 90, 92 respectively so as to seal the outlet port and the valving cavity.

Each of the valves 88, 90, 92 has a mounting lug denoted respectively 116, 118, 120 extending therefrom for facilitating mounting of the valve on the gasket 62 as will hereinafter be explained.

Each of the valves 88, 90, 92 has formed thereon preferably integrally therewith an electrical receptacle denoted respectively 22, 124, 126, each of which has provided therein a pair of electrical terminals denoted respectively 128, 130, 132.

Gasket 62 has embedded therein a plurality of conductive electrical strips (not shown in FIG. 1), each of which terminates and is connected to a terminal pin denoted respectively 134, 136, 138, 140, 142 provided in a receptacle shell 144 integrally molded with the end of the gasket. The distal or remote end of each of the aforesaid terminal strips is exposed and terminates in a second cavity formed in each of the bosses 64, 66, 68; and, one of which is shown in FIG. 2 and denoted by reference numeral 146. As shown in FIG. 2, one of the terminal strips 142 has the end 143 thereof terminating in the cavity 146. It will be understood that each of the embedded terminal strips has its end remote from the receptacle 144 exposed in one of the secondary cavities such as cavity 146 for the respective associated valve.

Upon insertion of the valves into the respective valving cavities, each of the connector terminals 128, 130, 132 provided on the valves makes connection with the associated terminal strips provided in one of the secondary cavities such as cavity 146. It will be understood that the electrical connection for the valve 90 illustrated in FIG. 2, where connector terminal 130 makes connection with the embedded conductor strips in cavity 146, one of which is illustrated and denoted by reference numeral 142 in FIG. 2 is typical for the electrical connector of the other valves 88, 92.

Each of the valves 88, 90, 92 is retained in its respective valving cavity and in connection with the corresponding electrical conductor strips by a retaining bracket, and preferably a common bracket, denoted by reference numeral 148 which has clearance apertures 150, 152, 154 formed therein such that the bracket is received over the valves and bosses and registers against the undersurface of the gasket 62. Each of the clearance apertures 150, 152, 154 has a tab or lug denoted respectively 156, 158, 160, preferably formed integrally therewith, which registers against the corresponding mounting lug 116, 118, 120 respectively for retaining each valve in its desired position in the valving cavity. The mounting bracket 148, valves 88, 90, 92, and gasket 62 are retained as an assembly against the undersurface of the manifold 32 by a plurality of fasteners 162 which are received through holes 164 provided in the bracket 148 and holes 166 provided in the gasket 62 and which each engage a correspondingly located threaded hole (not shown) formed in the undersurface of the manifold 32.

The tabs 156, 158, 160 bear against the lugs 116, 118, 120 to retain the valves; and, if desired the electrical terminals 128, 130, 132 may be housed in a shell 168, 170, 172 respectively, which may each have a barb thereon for snap locking in a notch in the cavity such as shown typically at 174, 176 in FIG. 2.

The present invention thus provides a simple, easy to assembly electro-hydraulic manifold assembly suitable for engine valve disablement application which is relatively low in cost in high volume mass production as required for light truck and passenger vehicle applications:

Although the invention has hereinabove been described with respect to the illustrated embodiments, it will be understood that the invention is capable of modification and is limited only by the following claims.

What is claimed is:

1. An electro-hydraulic assembly for use in combination chamber valve deactivation in an internal combustion engine comprising:

(a) manifold having an inlet pressure gallery ported to a surface of the manifold in a plurality of supply pressure ports and having a separate control pressure passage associated with each of said ports;

(b) a gasket plate formed of electrically non-conductive material and having a plurality of valve bosses spaced on a common side thereof, with each boss defining a valving cavity communicating with an inlet passage and an outlet passage formed in the plate;

(c) a plurality of electrical conductors embedded in said plate, each having one end portion thereof exposed and associated with, one of said bosses, and an end remote from said one end terminated for external electrical connection thereto;

(d) an electrically operated valve disposed on each of said bosses with the inlet and outlet thereof received in said valving cavity and isolated for communicating respectively with one of said inlet and outlet passages, said valve having an electrical terminal thereon making contact with said one end portion of said adjacent electrical conductor;

(e) retaining means operable for securing each of said valves in the respective valving cavity; and, (f) fastening means operable for attaching said gasket plate to said manifold with said inlet passage communicating with said supply port and said outlet passage communicating with said control pressure passage.

2. The assembly defined in claim 1, wherein each of said remote conductor ends is terminated in a common receptacle.

3. The assembly defined in claim 1, wherein said plate has a second boss disposed adjacent each of said valve bosses, with said one end of said conductor exposed on said second boss.

4. The assembly defined in claim 1, wherein one end of said conductor is connected to said valve terminal by plug-in connection when said valve is received in said valving cavity.

5. The assembly defined in claim 1, wherein said gasket plate is formed of plastic material.

6. The assembly defined in claim 1, wherein said gasket plate is formed of plastic material molded over said conductors.

7. The assembly defined in claim 1, wherein said gasket plate has an electrical receptacle thereon with the remote end of each of said electrical leads connected thereto.

8. A method of making a combination gasket, valve and electrical buss assembly for an engine valve deactivation manifold assembly comprising:

(a) providing a manifold having an inlet gallery ported to a common surface of the manifold in a plurality of supply pressure ports and having a separate control pressure passage associated with each of said ports;

(b) forming a gasket plate of electrically non-conductive material and forming a plurality of valve bosses spaced on a common side thereof and forming a valving cavity in the boss and forming an inlet and outlet passage communicating with the valving cavity;

(c) embedding a plurality of electrical conductors in the plate;

(d) disposing an electrically operated valve in each of said valving cavities and communicating the inlet and outlet of the valve with the respective inlet and outlet passage;

(e) connecting one end of each of said conductors respectively to one of said valves;

(f) retaining each of said valves on the respective boss and, (g) attaching said gasket plate to said manifold and communicating said supply pressure port with said inlet passage and said control pressure port with said outlet passage.

9. The method defined in claim 8, wherein said step of connecting one end of said conductor includes making a plug-in connection between a terminal on the valve and said conductor.

10. The method defined in claim 8, wherein said step of forming a gasket plate includes forming a plate of plastic material.

11. The method defined in claim 8, wherein said step of forming a plate includes molding a plate of plastic material.

12. The method defined in claim 8, wherein said step of embedding conductors includes insert molding.

13. The method defined in claim 8, wherein said step of embedding conductors includes extending another end of each of said conductors to a common marginal region of the plate.

14. The method defined in claim 8, wherein said step of retaining said valves includes disposing a common retaining bracket over said gasket plate and securing said bracket in contact with said gasket.

15. The method defined in claim 8, wherein said step of forming a gasket plate includes exposing said one end of said conductor on said boss.

* * * * *